US010393299B2

(12) United States Patent
Harnetiaux et al.

(10) Patent No.: US 10,393,299 B2
(45) Date of Patent: Aug. 27, 2019

(54) QUICK COUPLING FOR FLEXIBLE TUBE

(71) Applicant: CNH Industrial America LLC, New Holland, PA (US)

(72) Inventors: Travis L. Harnetiaux, Bourbonnais, IL (US); Chad M. Johnson, Arlington Heights, IL (US)

(73) Assignee: CNH Industrial America LLC, New Holland, PA (US)

( * ) Notice: Subject to any disclaimer, the term of this patent is extended or adjusted under 35 U.S.C. 154(b) by 35 days.

(21) Appl. No.: 15/642,964

(22) Filed: Jul. 6, 2017

(65) Prior Publication Data
US 2017/0299098 A1   Oct. 19, 2017

Related U.S. Application Data

(62) Division of application No. 14/320,838, filed on Jul. 1, 2014, now Pat. No. 9,719,620.

(51) Int. Cl.
| *F16L 33/32* | (2006.01) |
| *F16L 33/22* | (2006.01) |
| *F16L 21/00* | (2006.01) |
| *F16L 33/23* | (2006.01) |
| *A01C 7/08* | (2006.01) |
| *F16L 37/248* | (2006.01) |

(52) U.S. Cl.
CPC ............ *F16L 33/222* (2013.01); *A01C 7/082* (2013.01); *F16L 21/007* (2013.01); *F16L 33/23* (2013.01); *F16L 33/32* (2013.01); *F16L 37/248* (2013.01)

(58) Field of Classification Search
CPC ....... F16L 37/107; F16L 37/248; F16L 37/02; F16L 37/025; F16L 37/04; F16L 33/32; F16L 21/007; F16L 33/222; F16L 33/23
See application file for complete search history.

(56) References Cited

U.S. PATENT DOCUMENTS

| 1,890,011 A | 12/1932 | Wirz |
| 2,547,394 A | 4/1951 | Hynes |
| 2,562,014 A | 7/1951 | Buhayar |
| 3,208,757 A | 9/1965 | Jageman |
| 3,403,720 A | 10/1968 | Ahleen |
| 4,083,586 A | 4/1978 | Helm |
| 4,188,051 A | 2/1980 | Burge |
| 4,220,361 A | 9/1980 | Brandenberg |
| 4,600,221 A | 7/1986 | Bimba |
| 4,948,178 A | 8/1990 | Sauer |
| 5,028,078 A | 7/1991 | Schwarz et al. |
| 5,230,539 A | 7/1993 | Olson |

(Continued)

FOREIGN PATENT DOCUMENTS

FR     1511053 A      1/1968

OTHER PUBLICATIONS

Pioneer Agricultural Quick Coupling Products, parker.com, Sep. 6, 2013 (2 pages).

*Primary Examiner* — David Bochna
*Assistant Examiner* — James A Linford
(74) *Attorney, Agent, or Firm* — Reecca L. Henkel; Rickard K. DeMille

(57) ABSTRACT

A quick coupling for a flexible tube has an outer annular element with a bayonet connection and a central bore which receives an annular insert having two arcuate sections and holding the flexible tube in place through barbs. The inserts are removable from the outer annular coupling by means of a detent at which point the arcuate sections may be easily removed from the flexible tube.

7 Claims, 3 Drawing Sheets

(56) References Cited

U.S. PATENT DOCUMENTS

| | | |
|---|---|---|
| 5,275,448 A | 1/1994 | McNaughton et al. |
| 5,303,958 A | 4/1994 | Hyatt et al. |
| 2004/0108712 A1 | 6/2004 | Liang |
| 2011/0272939 A1 | 11/2011 | Stettner et al. |
| 2011/0309616 A1 | 12/2011 | Mager et al. |

QUICK COUPLING FOR FLEXIBLE TUBE

CROSS REFERENCE TO RELATED APPLICATIONS

This is a divisional non-provisional patent application based on U.S. patent application Ser. No. 14/320,838, filed Jul. 1, 2014, entitled, "QUICK COUPLING FOR FLEXIBLE TUBE", which is incorporated herein by reference in its entirety.

BACKGROUND OF THE INVENTION

1. Field of the Invention

The present invention relates to couplers and, more particularly, to quick couplings for flexible tubes that may be used in seed planters.

2. Description of the Related Art

An agricultural seeder, such as a row crop planter, places the seed at a desired depth within a plurality of parallel seed trenches (or furrows) formed in soil. In the case of a row crop planter, a plurality of row crop units are typically ground driven using wheels, shafts, sprockets, transfer cases, chains and the like, or driven by a hydraulic or electric motor based on ground speed obtained from electronic sensors. Each row crop unit has a seed metering and distribution mechanism to properly meter seeds at a predetermined rate and to place the seeds at predetermined spaced locations and depth. The row crop unit is movably coupled with a tool bar and includes a mini hopper for seed. The row crop planter usually carries a main seed hopper or bulk fill tank which employs flexible tubes to distribute seed to the mini hoppers in each of the row crop units. The seeds are pneumatically driven along the tube between the bulk fill tank and the mini hoppers.

The operating environment for the row crop planter is such that the flexible tubes need to be quickly disconnected from both the bulk fill tank and especially the mini hoppers. Quick connect couplings are used for this purpose. It is common practice to utilize hose barbs on the quick coupling to positively retain the flexible tube in place. While it is an easy process to install the flexible tube in the coupling, it is problematic to remove the tube for various maintenance purposes. The reason is that the hose barbs do not permit removal of the flexible tube from the coupling without either heating and or splitting of the tube. This process requires the flexible tube to be shortened if the tube is to be reused in the coupling. After just a few occurrences of this operation, the length of the flexible tube may be shortened enough that it did becomes unusable.

What is needed in the art is a quick coupling that enables removal of the flexible tube from the quick coupling and be reused without damage to the tube.

SUMMARY OF THE INVENTION

The present invention provides the ability to reuse a flexible tube after removal from a quick coupling.

The invention, in one form, is directed to a quick coupling for a flexible tube. The coupling includes an outer annular coupling element having a quick disconnect attachment feature and a central bore. An annular insert has at least two arcuate sections connectable to one another to form an outer annular surface received within the central bore. The insert has an inner annular surface having a diameter sized to receive the end of the flexible tube with the annular insert having at least one barb element formed on the interior surface and oriented to resist removal of the tube. The outer annular surface of the insert and the central bore of the outer annular coupling element cooperate to form a detent for removable retention of the insert and the tube within the coupling. Removal of the insert permits the arcuate sections to be removed from the flexible tube.

The invention, in another form, is directed to a row crop planter including a frame securable to a tractor and wheels on the frame for movement over the soil. A storage bin for seeds is mounted on the frame and a plurality of row crop units are mounted to the frame for planting seeds in the soil. A flexible tube extends from the storage bin to the individual row crop units for supplying seeds to each of the row crop units. A quick coupling is secured to the flexible tube for connecting the flexible tube to at least one of the storage bin and individual row crop units. The quick coupling includes an outer annular coupling element having a quick disconnect attachment feature and a central bore. An annular insert has at least two arcuate sections connectable to provide an outer annular surface and an inner annular surface having a diameter sized to receive the end of the flexible tube, with the annular insert having at least one barb element formed on its interior surface and oriented to resist removal of the tube from the insert. The outer annular surface of the insert and the central bore of the annular coupling element cooperate to form a detent for removable retention of the insert and the tube within the coupling to permit removal of the insert from the flexible tube.

An advantage of the present invention is undamaged removal of a flexible tube from a quick coupling.

Another advantage is reuse of flexible tubes after removal from a quick coupling.

Another advantage is to improve the physical retention and/or the air tightness of the coupling across a larger range of hose outer diameters, by allowing for inserts of different thicknesses or inserts made with a resilient material.

BRIEF DESCRIPTION OF THE DRAWINGS

The above-mentioned and other features and advantages of this invention, and the manner of attaining them, will become more apparent and the invention will be better understood by reference to the following description of an embodiment of the invention taken in conjunction with the accompanying drawings, wherein.

DETAILED DESCRIPTION OF THE INVENTION

Figure 1:
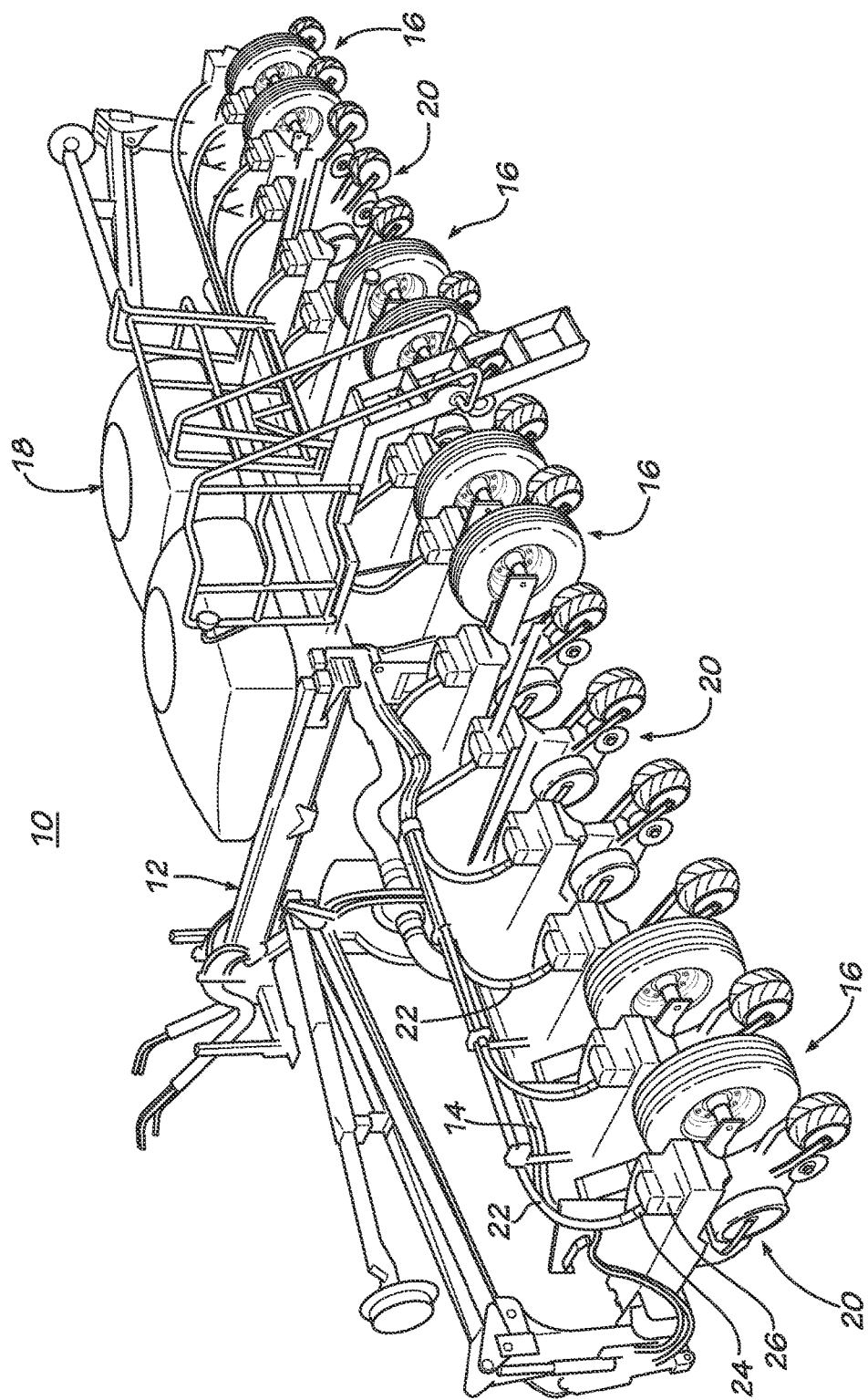
FIG. 1 is a perspective view of a seed planter with which the quick coupling of the present invention is used.

Referring now to the drawings, and more particularly to FIG. 1, there is shown a row crop planter 10 which includes a central frame 12 positioned to be secured to and towed behind a tractor or other work vehicle. They row crop planter 10 includes a transversely oriented toolbar 14 connected to the frame 12 and supporting a plurality of wheel assemblies 16 for movement across soil. Bulk fill tanks 18 are supported on frame 12 and provide the initial storage for seeds to be distributed to the soil.

A plurality of row crop units 20 are positioned at spaced locations along toolbar 14. Details of the internal mechanism of the row crop units are not discussed to enable a better understanding of the invention. However, the row crop units open the soil to a predetermined depth and meter, position and cover-up seeds at predetermined spacing before covering the seeds. A series of flexible tubes 22 extend from the bulk fill tanks 18 to the row crop units 20 and are connected to mini hoppers 26 for seeds by a quick coupling 24.

Figure 2:
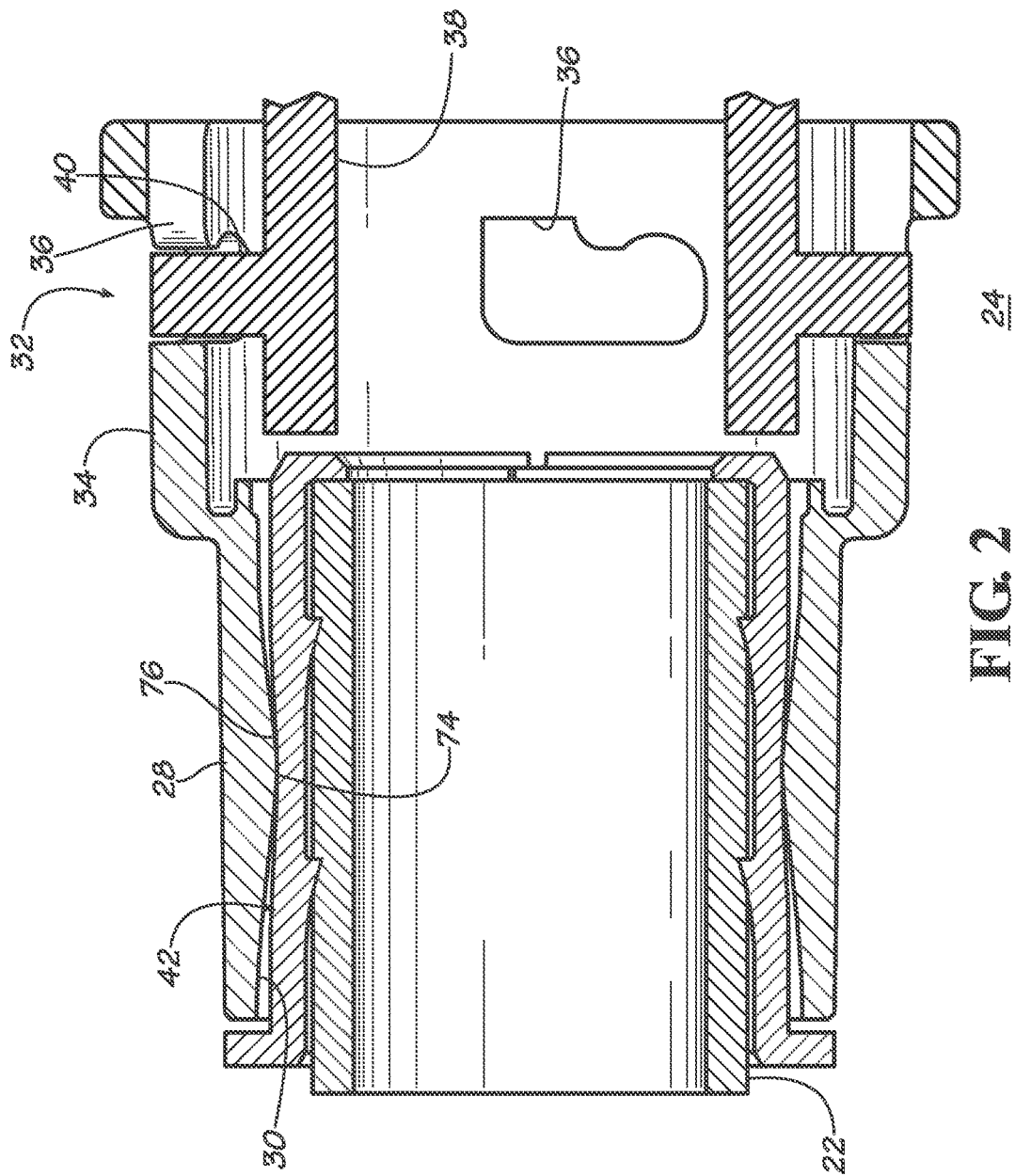
FIG. 2 is a longitudinal section view of the quick coupling used in FIG. 1; and, FIG. 3 is a perspective view of a component of the quick coupling of FIG. 2. Corresponding reference characters indicate corresponding parts throughout the several views. The exemplification set out herein illustrates one embodiment of the invention and such exemplification is not to be construed as limiting the scope of the invention in any manner.
Figure 3:
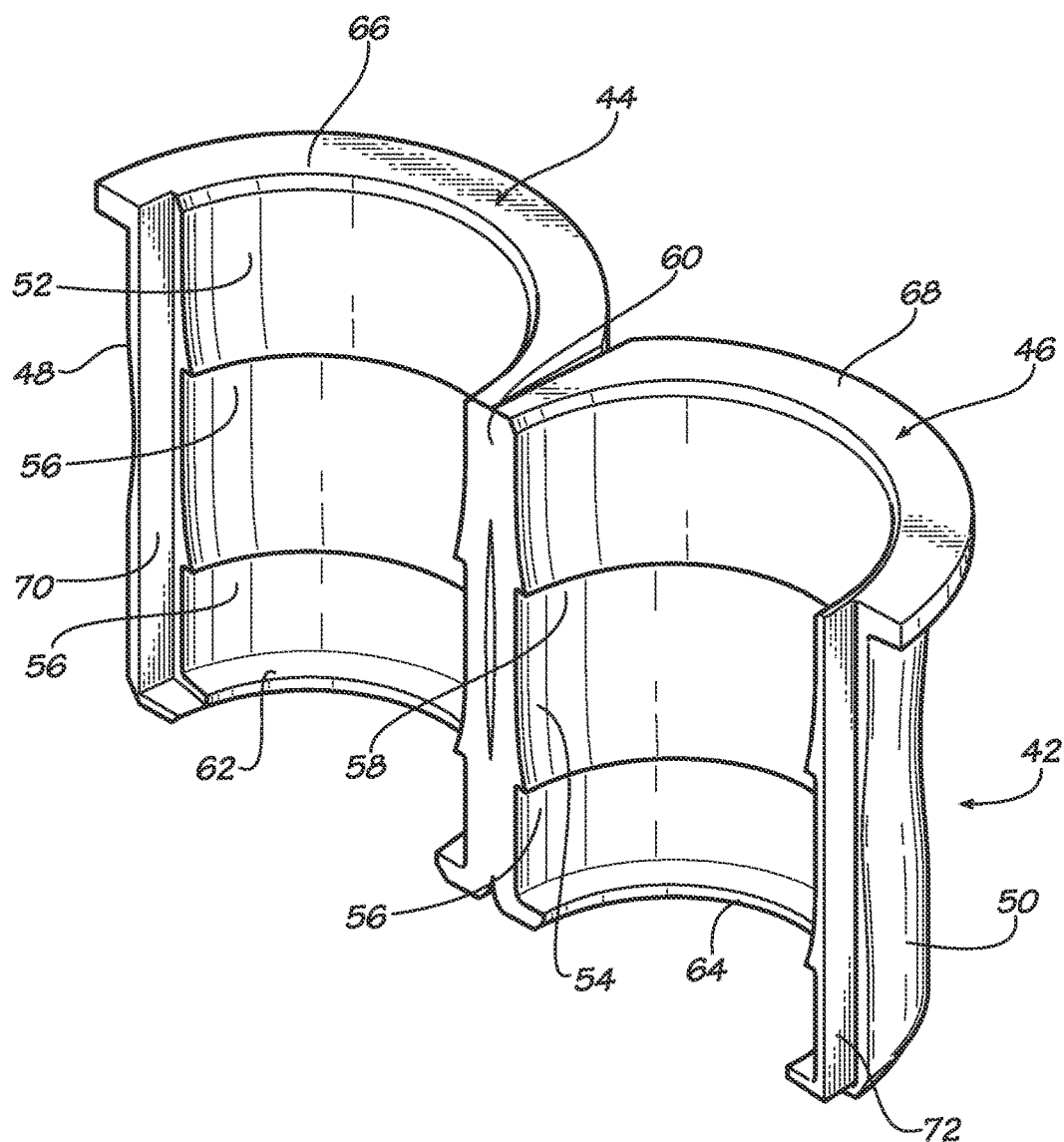

In accordance with the present invention, the quick coupling 24 shown in FIGS. 2 and 3 is utilized with flexible tube 22 to enable reuse of the tube 22 after removal from the quick coupling 24. Referring specifically to FIG. 2, the quick coupling 24 includes an outer annular coupling element 28 which has a central bore 30. A quick disconnect attachment feature 32 is included into an integral expanded annular end section 34 of the coupling element 28. End section 34 has a bayonet connecting slot 36 which cooperates with a tubular element 38 secured to the mini hopper 26. The tubular element 38 has bayonet engaging tabs 40 that cooperate with bayonet slot 36 to enable quick installation and removal of the coupling 24.

An annular insert 42 has arcuate half sections 44 and 46, shown specifically in FIG. 3. The arcuate half sections 44 and 46 have outer annular surfaces 48 and 50, respectively which are sized to be received within a central bore 30 of the outer annular coupling element 28. The arcuate half sections 44 and 46 also have inner annular surfaces 52 and 54 sized to receive flexible tube 22. Annular barbs 56 and 58 are provided on the inner annular surfaces 52 and 54 of the arcuate halves 44 and 46, respectively. Annular barbs 56 and 58 have a protrusion that extends into the outer surface of flexible tube 22 and is angled to prevent removal or movement of the tube out of the annular insert 42. While a pair of barbs 56 and 58 are shown, any number of barbs may be employed for adequate sealing and retention. In addition, the barbs may be eliminated and the tube 22 held by friction against annular surfaces 52 and 54.

As illustrated in FIG. 3, the arcuate sections 44 and 46 are joined by an integral axially extending hinge 60 that is typically used for parts made of plastic. It should be noted however, that the arcuate halves 44 and 46 may be utilized as separate pieces. Furthermore, more than two arcuate sections may be employed in the quick coupling 24.

In order to position the end of the flexible tube 22 at a predetermined axial position, inward directed flanges 62 and 64 are provided at one end of the arcuate half sections 44 and 46, respectively. Outward directed flanges 66 and 68 on the arcuate sections 44 and 46 provide a limit to the depth to which the insert 42 and flexible tube 22 extend into the outer annular coupling element 28. When the arcuate sections 44 and 46 are joined by an integral hinge as shown in FIG. 3, overlap edges 70 and 72 are provided to enable better sealing of the annular insert 42. A detent feature is provided between the outer annular coupling element 28 and the annular insert 42 by providing an inward directed protrusion 74 in the form of a ramp on interior bore 30 and a recess 76 on the outer annular surfaces 48 and 50 of the arcuate halves 44 and 46. In operation, the flexible tube 22 is inserted into annular insert 42 against end flanges 62 and 64. Annular insert 42 is then inserted into outer annular coupling element 28 so that the protrusion 74 is seated in recess 76. The quick coupling attachment feature 32 may be employed to connect flexible tube 22 to the tubular element 38. If it is necessary to remove the tube 22, the quick coupling 24 is first disengaged from tubular element 38. When it is necessary to remove the flexible tube from the quick coupling 24, it is simply pulled out axially past the detent. The flexibility of the annular insert 42 allows the insert to be removed from the central bore 30. Once it is removed, the arcuate sections 44 and 46 they may be removed in a radial direction so that any operation may be performed on the flexible tube 22 by itself. It should be noted that the arrangement of the arcuate sections permits removal of the flexible tube 22 from the quick coupling 24 without damage to the tube 22. This greatly facilitates reuse of the tube without altering its length.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A row crop planter comprising:
   a frame securable to and towable by a tractor;
   wheels on the frame for permitting movement over soil;
   at least one storage bin for seeds mounted on the frame;
   a plurality of transversely positioned row crop units mounted to the frame for planting seeds in the soil; and,
   a quick coupling including a flexible tube having an outer surface;
   wherein the quick coupling is secured to the flexible tube for connecting the flexible tube to the at least one storage bin and individual row crop units, the quick coupling comprising:
      an outer annular coupling element having a quick disconnect attachment feature and an inner surface defining a central bore, the inner surface including a convex detent formed therealong; and
      an annular insert having at least two arcuate sections forming an outer annular surface received within the central bore and an inner annular surface defining a cavity with a diameter sized to receive an end of the flexible tube, the inner surface including a plurality of spaced barb elements engageable with the outer surface of the flexible tube for retaining the end of the flexible tube within the cavity of the annular insert, the annular insert including a groove on the outer surface thereof,
   wherein the convex detent formed along the inner surface of the outer annular coupling is engageable with the groove of the outer annular surface of the annular insert for removably retaining the annular insert within the central bore of the outer annular coupling element,
   wherein a space is formed on each side of the convex detent and its corresponding groove when the detent engages the groove in an engaged position, in the engaged position the space is formed between the outer annular coupling element and the annular insert, such that the only contact between the outer annular coupling element and the annular insert is via the engagement of the convex detent and the groove, wherein each barb element comprises an annular rib with a pointed protrusion angled to hold the flexible tube in place, such that each barb element is positioned against an outer surface of the flexible tube when the annular insert and the flexible tube are in an engaged position, and wherein a space is formed on each side of each barb element between the annular insert and the flexible tube, wherein the quick disconnect attachment feature is a bayonet coupling comprising male tabs and female slots, and wherein in the engaged position, an apex of the convex detent is positioned between the plurality of spaced barb elements and the apex abuts the deepest portion of the groove.

2. The row crop planter as claimed in claim 1, wherein the annular insert is defined by first and second arcuate sections.

3. The row crop planter as claimed in claim 2, wherein the first and second arcuate sections are connected by an axially directed hinge.

4. The row crop planter as claimed in claim 3, wherein the first and second arcuate sections have edges remote from the hinge, and the edges of the arcuate sections remote from the hinge have an overlap.

5. The row crop planter as claimed in claim 1, wherein the plurality of spaced barb elements cooperate to hold the flexible tube in an engaged position against the annular insert for removably retaining the flexible tube within the central bore of the annular insert, the plurality of spaced barb elements of the annular insert engageable with the outer surface of the flexible tube and configured to press into the flexible tube to form recesses in the outer surface of the flexible tube while engaged with the flexible tube.

6. The row crop planter as claimed in claim 5, wherein one side of each barb element is configured to form a right angle and an opposite side of each barb element is configured to form a sloping obtuse angle to form the pointed protrusion.

7. The row crop planter as claimed in claim 1, wherein in the convex detent is a ramp formed on the central bore of the annular coupling and projecting inward, the annular insert having a recessed section around its outer periphery for receiving the convex detent.

* * * * *